United States Patent
Mithani et al.

(10) Patent No.: US 11,048,526 B2
(45) Date of Patent: Jun. 29, 2021

(54) METHODS AND SYSTEMS FOR MANAGING COMPUTING DEVICES WITH SPECIFICATION MIGRATION

(71) Applicant: INTERNATIONAL BUSINESS MACHINES CORPORATION, Armonk, NY (US)

(72) Inventors: Rajan D. Mithani, Pune (IN); Sasikanth Eda, Vijayawada (IN); Abhishek Jain, Baraut (IN); Deepak Ghuge, Sangamner (IN); Manojkiran Eda, Vijayawada (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 15/946,861

(22) Filed: Apr. 6, 2018

(65) Prior Publication Data
US 2019/0310863 A1    Oct. 10, 2019

(51) Int. Cl.
| | |
|---|---|
| *G06F 16/00* | (2019.01) |
| *G06F 9/445* | (2018.01) |
| *H04L 29/08* | (2006.01) |
| *G06F 3/06* | (2006.01) |
| *G06F 9/455* | (2018.01) |

(52) U.S. Cl.
CPC .......... *G06F 9/4451* (2013.01); *G06F 3/0647* (2013.01); *G06F 9/455* (2013.01); *H04L 67/10* (2013.01)

(58) Field of Classification Search
CPC ...... G06F 9/4451; G06F 3/0647; G06F 9/455; G06F 16/116; G06F 16/214; G06F 16/254; G06F 16/258; G06F 16/84; G06F 3/0653; G06F 3/0604; G06F 3/067; H04L 67/10; H04L 67/306; H04W 4/50
See application file for complete search history.

(56) References Cited

U.S. PATENT DOCUMENTS

| | | | |
|---|---|---|---|
| 7,904,681 B1 * | 3/2011 | Bappe | G06F 3/0647 711/162 |
| 8,233,879 B1 | 7/2012 | Lee et al. | |
| 8,594,723 B2 * | 11/2013 | Jain | H04W 36/0066 455/552.1 |
| 9,426,031 B2 | 8/2016 | Baribault et al. | |
| 2005/0210532 A1 * | 9/2005 | Winick | H04L 63/20 726/22 |
| 2006/0120518 A1 * | 6/2006 | Baudino | H04L 67/303 379/91.02 |
| 2006/0236056 A1 * | 10/2006 | Nagata | G06F 3/0653 711/165 |

(Continued)

*Primary Examiner* — Noosha Arjomandi
(74) *Attorney, Agent, or Firm* — Griffiths & Seaton PLLC

(57) ABSTRACT

Embodiments for managing mobile electronic devices are described. At least one user-device interaction characteristic associated with a first mobile electronic device having a first set of hardware attributes is received. The operation of a second mobile electronic device having a second set of hardware attributes is tuned based on one or more of the at least one of the user-device interaction characteristics, a comparison of the first set of hardware attributes and the second set of hardware attributes, or a combination thereof.

21 Claims, 8 Drawing Sheets

(56) References Cited

U.S. PATENT DOCUMENTS

| | | | |
|---|---|---|---|
| 2009/0233596 A1* | 9/2009 | Calabrese | H04W 4/18 455/426.1 |
| 2009/0318185 A1* | 12/2009 | Lee | H04M 1/72409 455/550.1 |
| 2010/0049917 A1* | 2/2010 | Kono | G06F 3/0647 711/114 |
| 2011/0113022 A1 | 5/2011 | Polychronidis | |
| 2011/0156944 A1* | 6/2011 | Ward | G08C 23/04 341/176 |
| 2012/0298737 A1* | 11/2012 | Thakar | G06Q 30/0621 235/375 |
| 2013/0110992 A1* | 5/2013 | Ravindra | H04W 8/18 709/220 |
| 2013/0303159 A1* | 11/2013 | Gathala | G06N 5/043 455/425 |
| 2014/0237518 A1* | 8/2014 | Liu | B60N 2/818 725/75 |
| 2014/0378097 A1* | 12/2014 | DeLuca | H04W 4/16 455/411 |
| 2015/0199616 A1* | 7/2015 | Rajendraprasad | G06N 20/00 706/12 |
| 2015/0341406 A1* | 11/2015 | Rockefeller | H04L 67/10 709/219 |
| 2016/0003623 A1* | 1/2016 | Venkatraman | G01C 21/20 701/410 |
| 2016/0057203 A1* | 2/2016 | Gardenfors | H04M 1/72412 455/566 |
| 2016/0098470 A1* | 4/2016 | Richman | H04L 67/34 709/203 |
| 2016/0109869 A1* | 4/2016 | Masten | G05B 19/0421 700/275 |
| 2016/0164735 A1 | 6/2016 | Baribault et al. | |
| 2016/0234340 A1 | 8/2016 | Dayan et al. | |
| 2016/0360412 A1* | 12/2016 | Wilson | H04W 12/04 |
| 2017/0053107 A1* | 2/2017 | Nahari | H04W 12/069 |
| 2017/0289790 A1* | 10/2017 | Singh | H04W 8/183 |
| 2018/0173317 A1* | 6/2018 | Kinnunen | G06F 16/176 |
| 2018/0246661 A1* | 8/2018 | Lemelev | G06F 3/065 |
| 2019/0028368 A1* | 1/2019 | Modi | H04L 41/0816 |
| 2019/0230511 A1* | 7/2019 | Wilson | H04W 12/04 |

* cited by examiner

METHODS AND SYSTEMS FOR MANAGING COMPUTING DEVICES WITH SPECIFICATION MIGRATION

BACKGROUND OF THE INVENTION

Field of the Invention

The present invention relates in general to computing systems, and more particularly, to various embodiments for managing electronic devices with the migration of characteristics from one device to another.

Description of the Related Art

In recent years, computing devices, such as mobile electronic devices or mobile devices (e.g., cellular/mobile/smartphones, personal digital assistants (PDAs), and tablets, etc.), have become widely used to the point that many people now have such a device with them at all times. These devices are able to assist users in a multitude of ways in their daily lives, such as internet access, scheduling, and entertainment, and particularly communication.

However, when a user begins using a new device (e.g., switches from an older device to a newer one) he/she may experience some discomfort and/or disruption in their experience with the new device due to different hardware attributes, settings, etc.

SUMMARY OF THE INVENTION

Various embodiments for managing mobile electronic devices by one or more processors are described. In one embodiment, by way of example only, a method for managing mobile electronic devices, again by one or more processors, is provided. At least one user-device interaction characteristic associated with a first mobile electronic device having a first set of hardware attributes is received. The operation of a second mobile electronic device having a second set of hardware attributes is tuned based on one or more of the at least one of the user-device interaction characteristics, a comparison of the first set of hardware attributes and the second set of hardware attributes, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
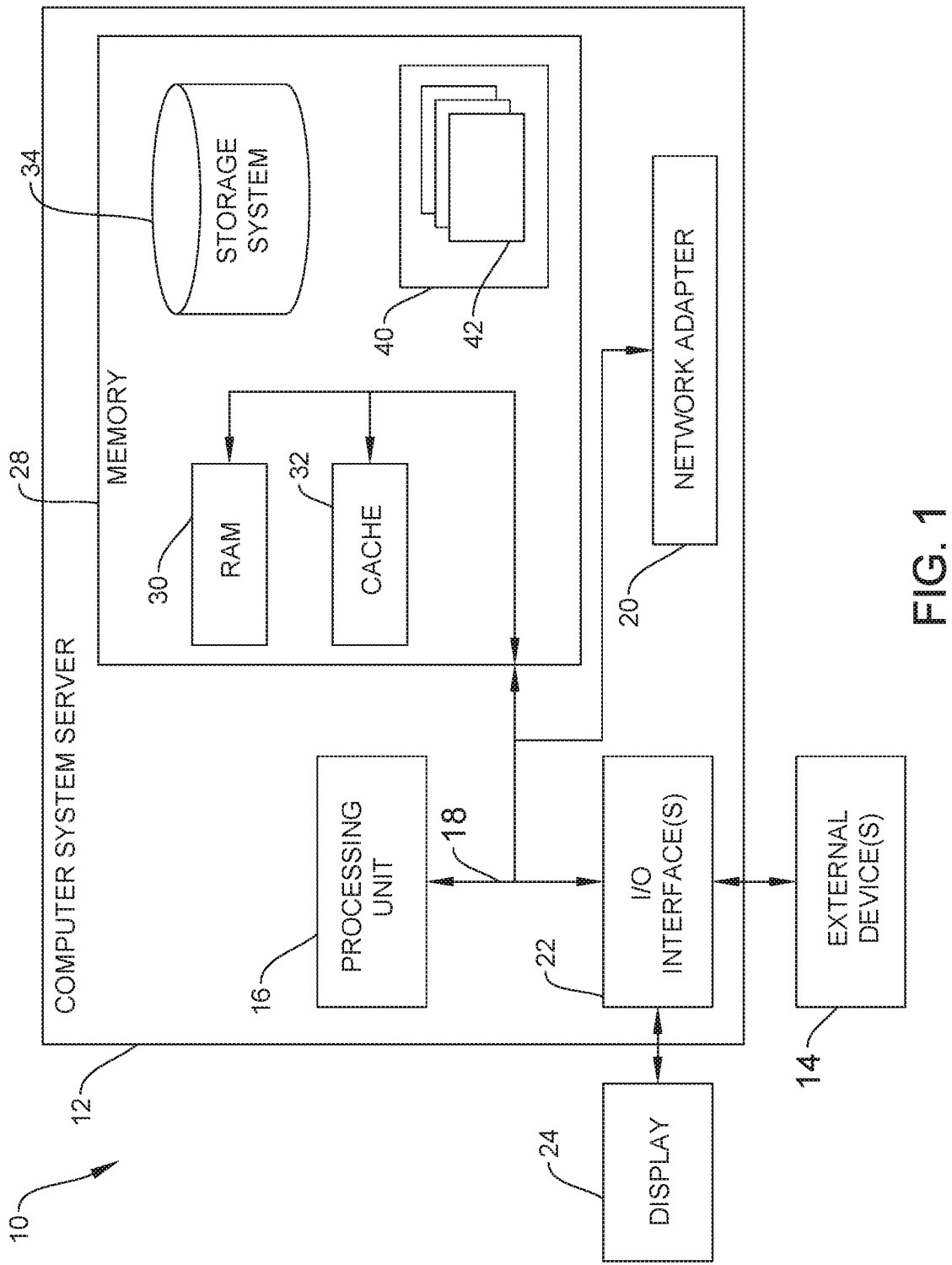
FIG. 1 is a block diagram depicting an exemplary computing node according to an embodiment of the present invention.

As discussed above, computing devices, such as mobile electronic devices or mobile devices (e.g., cellular/mobile/smartphones, personal digital assistants (PDAs), and tablets, etc.), have become widely used to the point that many people now have such a device with them at all times. These devices are able to assist users is a multitude of ways in their daily lives, such as internet access, scheduling, and entertainment, and particularly communication. However, when a user begins using a new device (e.g., switches from an older device to a newer one) he/she may experience some discomfort and/or disruption in their experience with the new device due to different hardware attributes, settings, etc.

As an example, consider a scenario in which an individual (or user) has become accustomed to using a first mobile electronic device (e.g., their "old" device) with the volume setting such that the loudness of the sounds produced by the speaker are at a particular volume (e.g., 94.3 A-weighted decibels (dBA)). That is, after several years of use, the individual may have gotten used to the loudness to distance ratio (i.e., the distance between the speaker and the user's ear required for comfortable use) when using the device (e.g., at a particular volume setting). However, when the individual switches to a second mobile electronic device (e.g., their "new" device), the effective volume of the sounds may be significantly different (e.g., 105.4 dBA) due to, for example, different hardware attributes, volume adjustment sensitivity/scale, etc.), resulting in some initial discomfort/interruption in use as the user gets used to the new loudness to distance ratio and/or experiments with the volume to find a comfortable setting.

As another example, an individual may be used to taking photographs with his/her old device that is optimized for camera use. Such a device may have minimal delay (e.g., fractions of a second) between when the "capture" button is actuated and when the photograph is captured. However, his/her new device may not be optimized for camera use, and may have a much longer delay (e.g., several seconds) between the capture button being actuated and the photograph being taken by the device. In such an instance, it may take days, even months, for the individual to become accustomed to the longer delay, resulting in many photographs being captured poorly and/or needing to be retaken.

As a further example, an individual may be used to using his/her old device to book a daily commute, which typically takes several minutes to identify Global Positioning System (GPS) coordinates and/or map a route. During this delay, the individual has become accustomed to performing some other task, such as finishing getting dressed, brushing his/her teeth, etc. However, a new device they begin to use may be able to perform the same task in just a few seconds (e.g., due to a faster processor). While this may seem like a beneficial trait, it may still result in some discomfort for the user, as he/she may be taken out of their usual routine (e.g., they may find themselves rushing to perform the other task(s)).

To address these needs, some embodiments described herein provide methods and systems for managing computing devices, such as mobile electronic devices, in such a way as to monitor user experience/interactions/daily routines with an older device and transfer that data to a newer device, which emulates the previous device behavior to provide a relatively smooth, seamless transition for the user.

According to some of the embodiments described herein, this is accomplished by, for example, monitoring and/or detecting user-device interaction characteristics associated with a first mobile electronic device, or more particularly, an individual's (or user's) interaction with and/or use of a first mobile electronic device. The operation of a second mobile electronic device is then tuned based on, for example, the user-device interaction characteristics and/or a comparison of the hardware attributes of the first and second mobile electronic devices.

As used herein, a "user-device interaction characteristic" (or interaction characteristic) may refer to any measurable behavior and/or aspect of performance/operation of a computing device (e.g., a mobile electronic device) as perceived by a user of the device. As described above, examples include, but are not limited to, speaker volume, a delay between the device receiving user input and taking an action in response to that input (e.g., capturing a photo), the time it takes to load an application and/or perform an operation related to an application, as well as display screen brightness (or luminance), microphone sensitivity, etc. As such, it should be understood that interaction characteristics may include and/or be based on device settings (e.g., a volume setting) and/or other various factors, such as device hardware attributes or specifications (e.g., power usage, speaker efficiency, processor speed, display screen size, etc.) and/or the manner in which the user interacts with/uses the device (e.g., the distance between the speaker on the device and the user's ear when talking on the phone).

In some embodiments, such interaction characteristics with respect to a user's interaction with a first (or "old") mobile electronic device are monitored and stored. When the user obtains a second (or "new") mobile electronic device, the interaction characteristics are transferred to and/or imported by the second device. The performance and/or operation of the second device is then "tuned" to mimic or emulate that of the first device. That is, in some embodiments, the second device is tuned so that the user's interaction with the second device is the same as it was with first device, at least to the extent possible with the hardware attributes of the second device.

In some embodiments, the tuning of the second device is at least in part based on a comparison of the hardware attributes of the first device and the second device. For example, with respect to speaker volume, if the second device has a more powerful and/or efficient speaker, the volume setting of the second device may be (automatically) set to a lower value than the user was using on the first device (e.g., to mimic the overall loudness/volume of sound generated by the speaker on the first device). Similarly, if the second device has a faster processor, resulting in some operations (e.g., loading an application, an action being performed through an application, etc.) being performed more quickly than similar operations on the first device, when the operation is performed by the second device, a delay may be introduced and/or the operation may be performed at a slower speed (e.g., to emulate the performance of the first device).

In some embodiments, the user may be provided with notifications regarding the capabilities of the second device (e.g., via electronic messages sent through the second device, pop-up windows/messages on the second device, etc.) and/or provided with the deactivate and/or "phase out" the mimicking/emulation functionality (e.g., to take advantage of the potential performance of the second device), while in some embodiments, the emulation functionality may be automatically phased out over time (e.g., over the course of a week, month, etc.). Also, in some embodiments, inquiries are provided to the user (e.g., via electronic messages, etc.) regarding the effectiveness of the emulation functionality. Feedback received from the user may be utilized to improve the emulation functionality for the user and/or other users.

In particular, in some embodiments, a method for managing mobile electronic devices is provided. At least one user-device interaction characteristic associated with a first mobile electronic device having a first set of hardware attributes is received. The operation of a second mobile electronic device having a second set of hardware attributes is tuned based on one or more of the at least one of the user-device interaction characteristics, a comparison of the first set of hardware attributes and the second set of hardware attributes, or a combination thereof.

The second set of hardware attributes may be different than the first set of hardware attributes. The at least one user-device interaction characteristic may include a first setting value associated with an aspect of functionality of the first mobile electronic device.

The tuning of the operation of the second mobile electronic device may include automatically changing a value setting associated with the aspect of functionality of the second mobile electronic device to a second value setting, wherein the second value setting is different from the first value setting. The aspect of functionality may include, for example, speaker volume or display screen brightness.

The at least one user-device interaction characteristic may include at least one of an aspect of user behavior associated with the first mobile electronic device and a delay between the first mobile electronic device receiving user input and the first mobile electronic device performing an operation in response to receiving the user input.

The receiving of the at least one user-device interaction characteristic may include transferring the at least one user-device interaction characteristic from the first mobile electronic device to the second mobile electronic device.

In some embodiments, the methods and/or systems described herein utilize "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to some embodiments described herein, tune the performance/operation of a computing device, perhaps based on feedback received from users, as described herein. Utilizing the models, the performance (or operation) of the system (e.g., utilizing/based on new inputs) may be predicted and/or the performance of the system may be optimized by investigating how changes in the input(s) effect the output(s).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
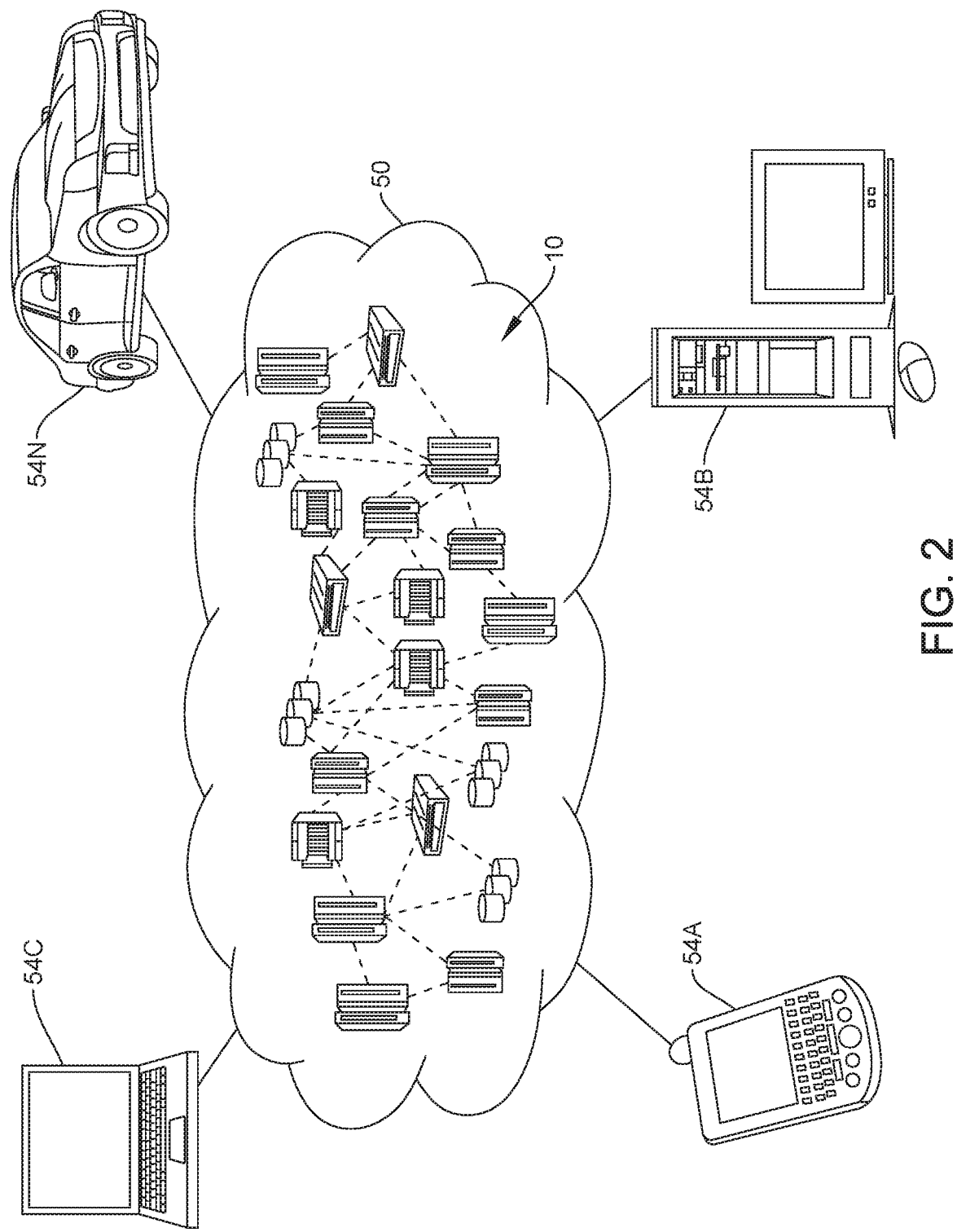
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, laptop computer 54C, and vehicles (e.g., automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
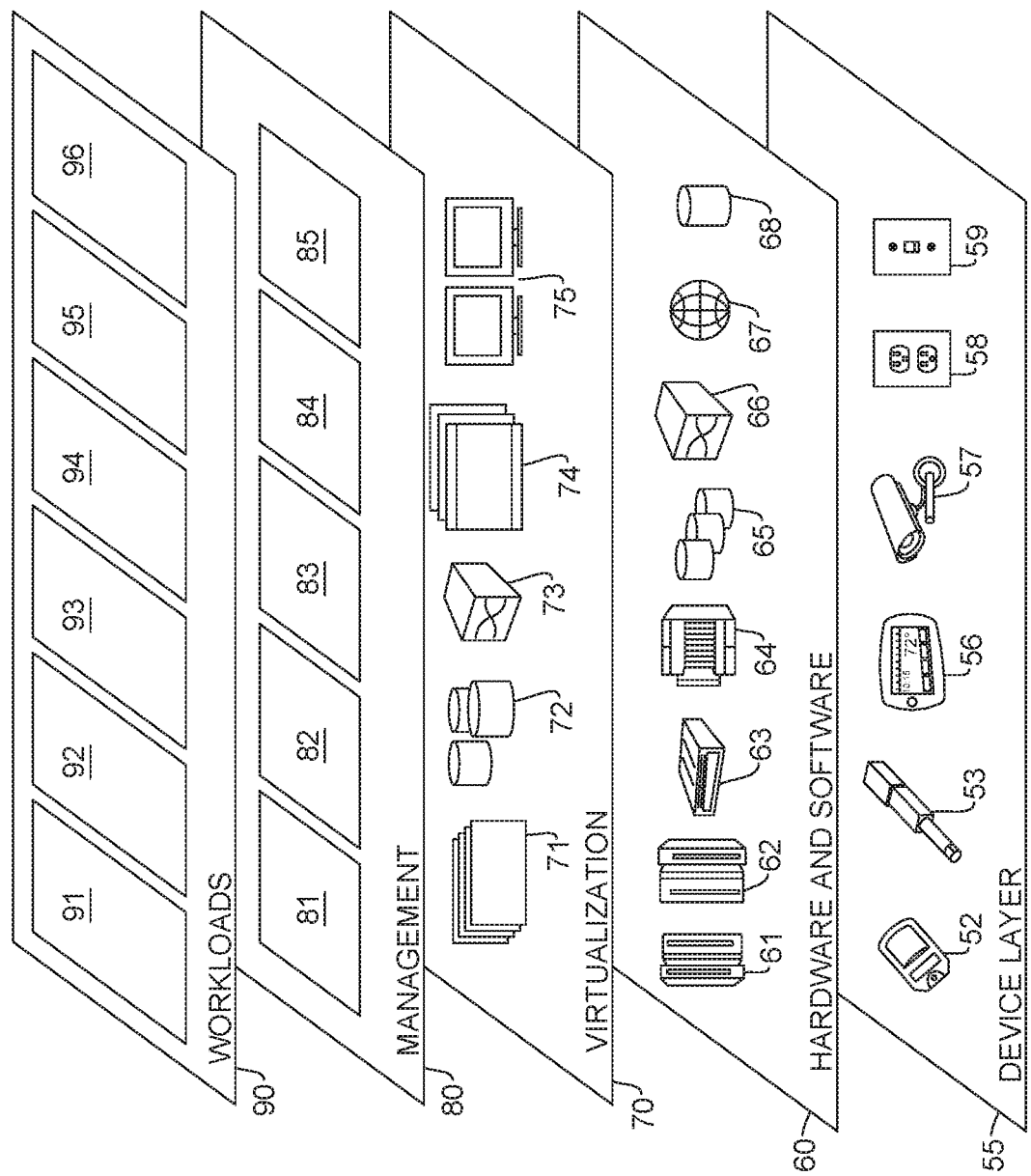
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, mobile electronic devices, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing computing devices, such as mobile electronic devices, as described herein. One of ordinary skill in the art will appreciate that the workloads and functions 96 for managing computing devices may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for managing computing devices, such as mobile electronic devices, in such a way as to mimic or emulate at least some aspects of operation or performance of a first/old mobile electronic device on a second/new mobile electronic device. One or more user-device interaction characteristics associated with the first device, or more particularly, an individual's (or user's) interaction with and/or use of a first device are monitored, detected, received, etc. The operation of the second mobile electronic device is then tuned based on, for example, the user-device interaction characteristic(s) and/or a comparison of the hardware attributes of the first and second devices.

Figure 4:
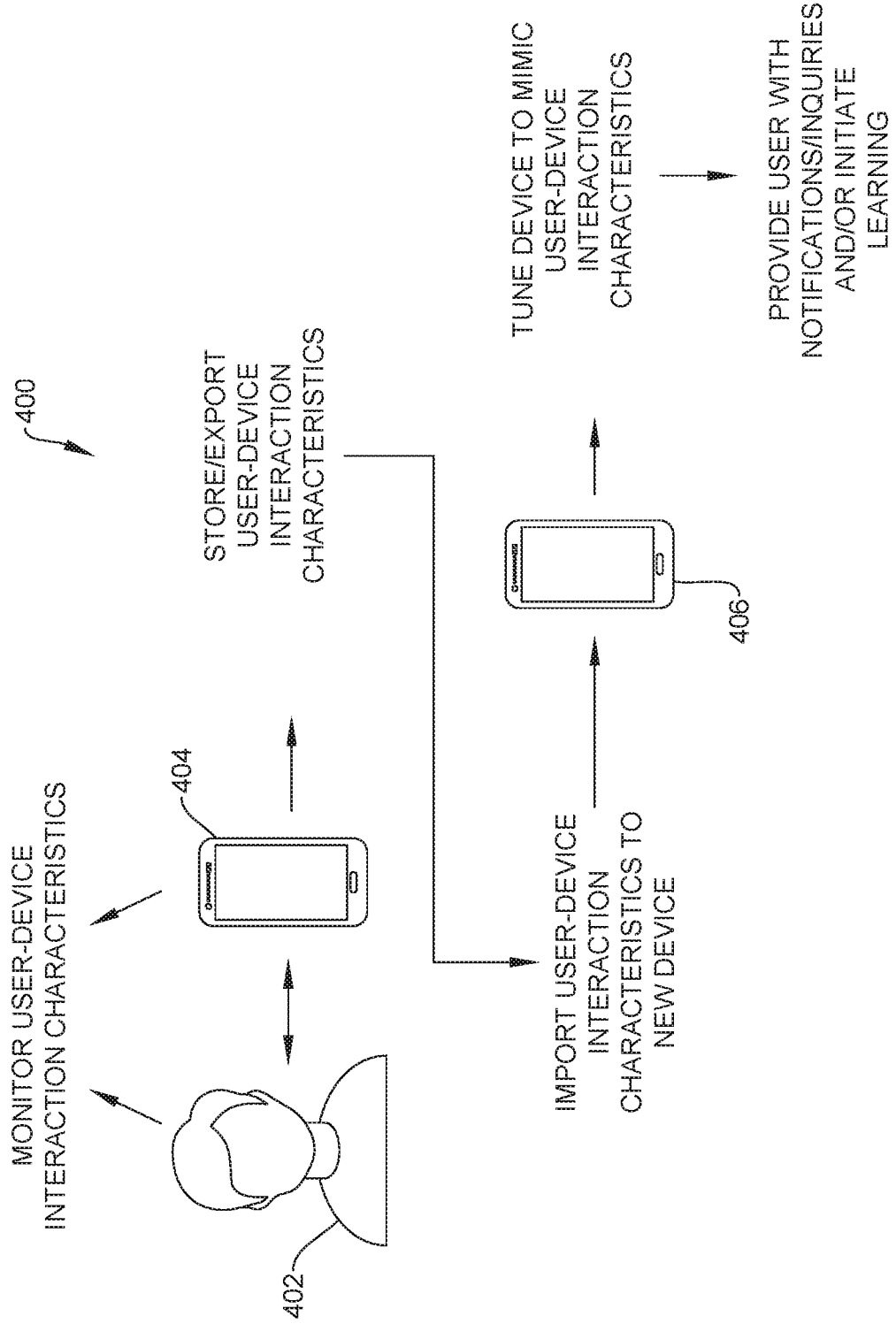
FIG. 4 is a simplified diagram of an exemplary computing environment illustrating various aspects of functionality according to an embodiment of the present invention.

Referring now to FIG. 4, a simplified block diagram of a computing environment 400 is shown, illustrating aspects of some embodiments described herein. The computing environment 400 includes a user (or individual) 402, a (first) mobile electronic device (or mobile device) 404 associated with (e.g., owned/used by, registered to, etc.) the user 402, and a second mobile device 406. The mobile devices 404 and 406 shown are in the form of mobile (or smart or cellular) phones. However, it should be understood that the embodiments described herein may be applicable to other types of mobile devices, such as PDAs, tablets, wearable devices, etc. Further, it should be understood some aspects described herein may be applicable to other types of computing devices, such as desktop computers, vehicular computing systems, etc. The first and second mobile devices 404 and 406 may each have a particular set of hardware and/or performance attributes (e.g., processor speed, memory size, screen size, speaker efficiency, power usage, power/battery capacity, etc.).

Although not shown in detail, the first mobile device 404 may include one or more sensors which may be utilized to determine how the user 402 utilizes the mobile device 404. For example, the first mobile device 404 may include one or more gyroscopic sensors (e.g., a microelectromechanical systems (MEMS) gyroscope) that may be utilized to detect movements and/or the orientation (e.g., angular orientation) of the first mobile device 404. Using such, it may be determined, for example, whether or not the first mobile device 404 is being held relatively upright during a phone call (i.e., which may be indicative of the user 402 not using a speaker phone functionality for the phone call) or is laying on a surface (e.g., a table or desk) during a phone call (i.e., which may be indicative of the speaker phone functionality being used). As another example, the first mobile device 404 may include temperature and/or humidity sensors which may be utilized to determine how close the mobile device 404 is being held to the body of the user 402 (e.g., the distance between the mouth or ear of the user 402 and the first mobile device 404 and/or a microphone and/or speaker thereon).

As shown in FIG. 4, one or more user-device interaction characteristics (or interaction characteristics) is monitored, stored, and/or exported (e.g., by and/or from the first mobile device 404). As described above, the interaction characteristics may be any measurable behavior and/or aspect of performance/operation of the first mobile device 404 as perceived by the user 402 while using the first mobile device 404. Examples include, but are not limited to, speaker volume (e.g., volume setting and/or the perceived "loudness"), a delay between the device receiving user input and taking an action in response to that input (e.g., capturing a photo), the time it takes to load an application and/or perform an operation related to an application, as well as display screen brightness (or luminance), microphone sensitivity, etc. As such, it should be understood that interaction characteristics may include, be based on, and/or be the result of device settings (e.g., a volume setting) and/or other various factors, such as device hardware attributes or specifications (e.g., power usage, speaker efficiency, processor speed, display screen size, etc.) and/or the manner in which the user interacts with/uses the device (e.g., the distance between the speaker on the device and the user's ear when talking on the phone).

In some embodiments, the interaction characteristic(s) are monitored by, for example, an operating system (e.g., on the mobile device 404), such as a daemon, and/or stored in a file, such as an Extensible Markup Language (XML) file or a JavaScript Object Notation (JSON) file. Exemplary data and/or pseudocode related to a set of interaction characteristics is shown below:

```
{
    "Camera":
    {
        "response_time": "1sec",
        "user_behavior": "ready to shoot mode"
    },
    "Front Camera":
    {
        "response_time": "3 sec",
        "user_behavior": "Getting ready for shoot"
    },
    "Speaker":
    {
        "loudness": "94.3 dBA",
        "user_behavior": "Keeps a distance 3 inches to ear"
    },
    "Microphone":
    {
        "response_time": "1sec",
        "user_behavior": "Keeps microphone close to mouth
            (measured by humidity)"
    },
    "Commute app":
    {
        "response_time": "3min",
        "user_behavior": "Away for device"
    },
}
```

As will be apparent to one skilled in the art, the interaction characteristics associated with the above exemplary data are related to the operation of a camera, a front camera (e.g., for taking "selfies"), a speaker, a microphone, and a commuting/mapping application.

Still referring to FIG. 4, the interaction characteristics are then transferred to and/or imported by (or onto) the second mobile device 406 (e.g., via wireless communication, memory card transfer, etc.). As described above, the second mobile device 406 is the same general type of device as the first mobile device 404 (e.g., a mobile phone). However, the second mobile device 406 may have a (second) set of hardware and/or performance attributes that is different than that of the first mobile device 404. For example, the second mobile device 406 may have a different processor speed, memory capacity, power usage, speaker efficiency, screen size, etc. In particular, the second mobile device 406 may be a newer, more advanced device with improved performance characteristics in general compared to the first mobile device 404.

The performance and/or operation (or specifications) of the second mobile device 406 is then tuned to mimic or emulate the interaction characteristics (i.e., to mimic the overall experience of the user with the first mobile device 404). More specifically, the second mobile device 406 is tuned to provide the user 402 with the same overall experience he/she was accustomed to when using the first mobile device 404 (i.e., as indicated by the interaction characteristics), at least to the extent possible given the hardware attributes of the second mobile device 406. As such, the second mobile device 406 may be tuned based on the interaction characteristics and/or a comparison of the respective hardware/performance attributes of the first and second mobile devices 404 and 406.

As one example, the interaction characteristics generated by the user 402 utilizing the first mobile device 404 may indicate that the user 402 experienced a particular "loudness" of sounds coming from the speaker as a result of, for example, the volume setting, the particular hardware attributes of the first mobile device 404 (e.g., speaker efficiency, power usage, etc.), and/or the manner in which the user 402 used the first mobile device. However, a comparison of the hardware attributes of the first mobile device 404 and the second mobile device 406 may indicate that the speaker on the second mobile device 406 is "better" (e.g., more efficient, better sound quality, etc.). As such, the tuning of the second mobile device 406 may include (automatically) setting the volume of the speaker on the second mobile device 406 at a lower value than it was on the first mobile device (e.g., 80% volume setting on the first mobile device 404 vs. 50% volume setting on the second mobile device 406).

As another example, the interaction characteristics may indicate that a camera (e.g., main camera and/or "selfie" camera) on the first mobile device 404 captures a photograph nearly instantaneously (e.g., within fractions of a second) after the "capture" button is actuated. However, the second mobile device 406 may not be optimized for camera use, and as a result, at least be initially configured in such a way that a much longer delay (e.g., several seconds) occurs between the capture button being actuated and the photograph being taken by the device. In such an example, the tuning of the second mobile device 406 may include (automatically) reconfiguring the second mobile device 406 to reduce that delay to mimic the operation of the camera(s) on the first mobile device 404 as much as possible (i.e., to whatever extent possible given the hardware specifications of the second mobile device 406).

As shown in FIG. 4, in some embodiments, after the second mobile device 406 is tuned to mimic the interaction characteristics, the user may be provided with notifications and/or inquiries regarding the mimicking and/or the capabilities of the second mobile device 406 (e.g., improved capabilities of the second mobile device 406 compared to those of the first mobile device 404) and/or a machine learning algorithm may be initiated or utilized to improve the mimicking of the interaction characteristics. For example, the user may be provided with one or more notifications (e.g., via text messages, pop-up windows, etc.) via the second mobile device 406 indicating that the second mobile device 406 has been tuned (e.g., to the extent possible) to mimic (at least some of) the interaction characteristics of the first mobile device 404, and perhaps specify which aspects of operation/performance have been tuned (e.g., speaker loudness, camera operation, application performance, etc.).

The notifications may inform that user that the second mobile device 406 is capable of "improved" performance with respect to some of the interaction characteristics. As one example, if the performance of an application has been slowed down and/or delayed in order to mimic the performance of the application on the first mobile device 404, the user may be informed that the second mobile device 406 is capable of running the application in a faster and/or more efficient manner. The user may (also) be provided with an inquiry related to the effectiveness of the mimicking functionality (e.g., how well he/she thinks the mimicking functionality is working). Any feedback received from the user may be utilized by the machine learning algorithm to make changes to and/or improve the mimicking functionality (e.g., for the particular user's device(s) and/or other users' devices). The user may (also) be provided with the option of whether or not to continue the mimicking functionality with respect to particular interaction characteristics or to end the mimicking functionality and more fully utilize the (improved) capabilities of the second mobile device 406. In some embodiments, the mimicking functionality is (e.g., at the option of the user) "phased out" over a period of time (e.g., over the course of weeks, months, etc.) so that the user may slowly become accustomed to the operation/performance of the second mobile device 406.

Figure 5:
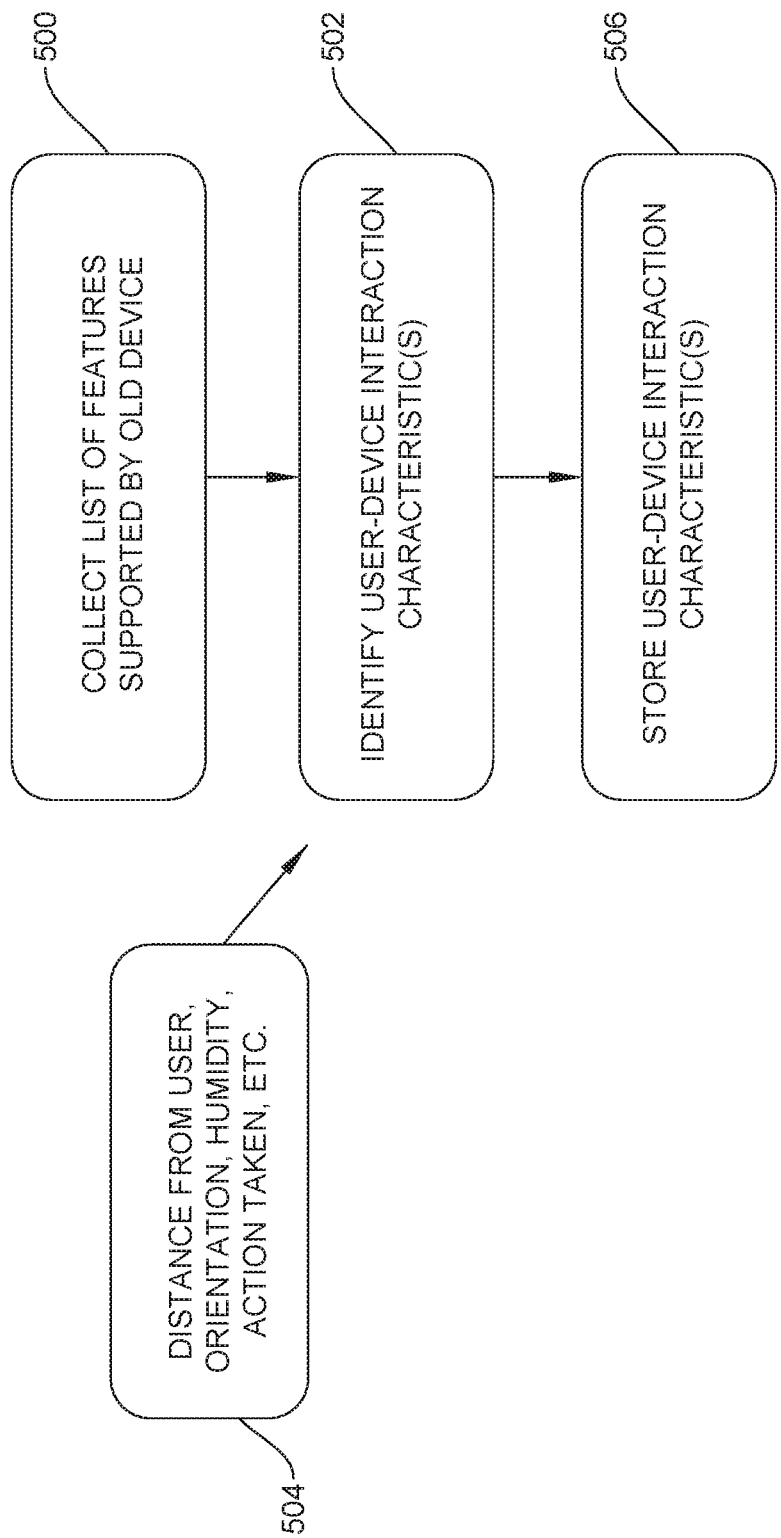
FIGS. 5-7 are block diagrams/flowcharts depicting various aspects of functionality described herein according to an embodiment of the present invention.
Figure 6:
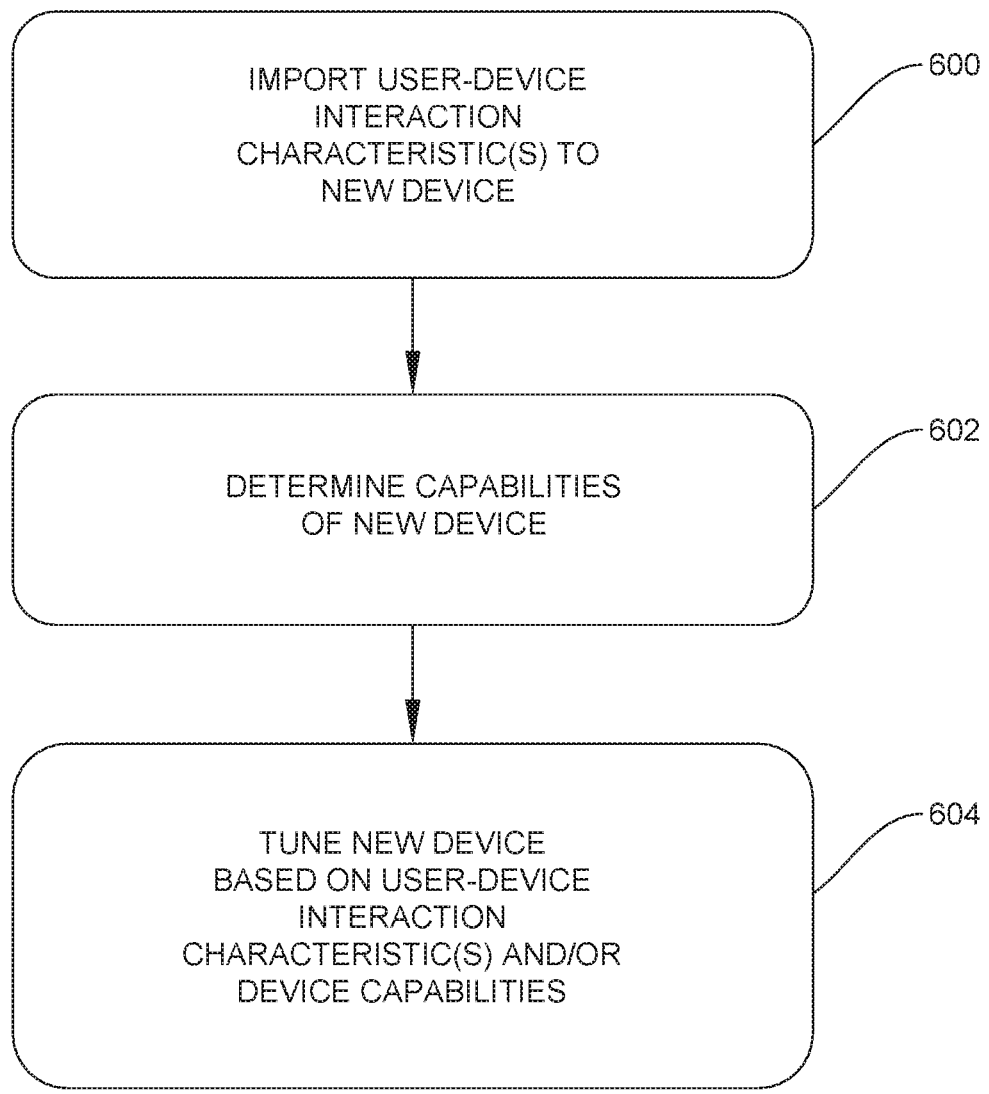
Figure 7:
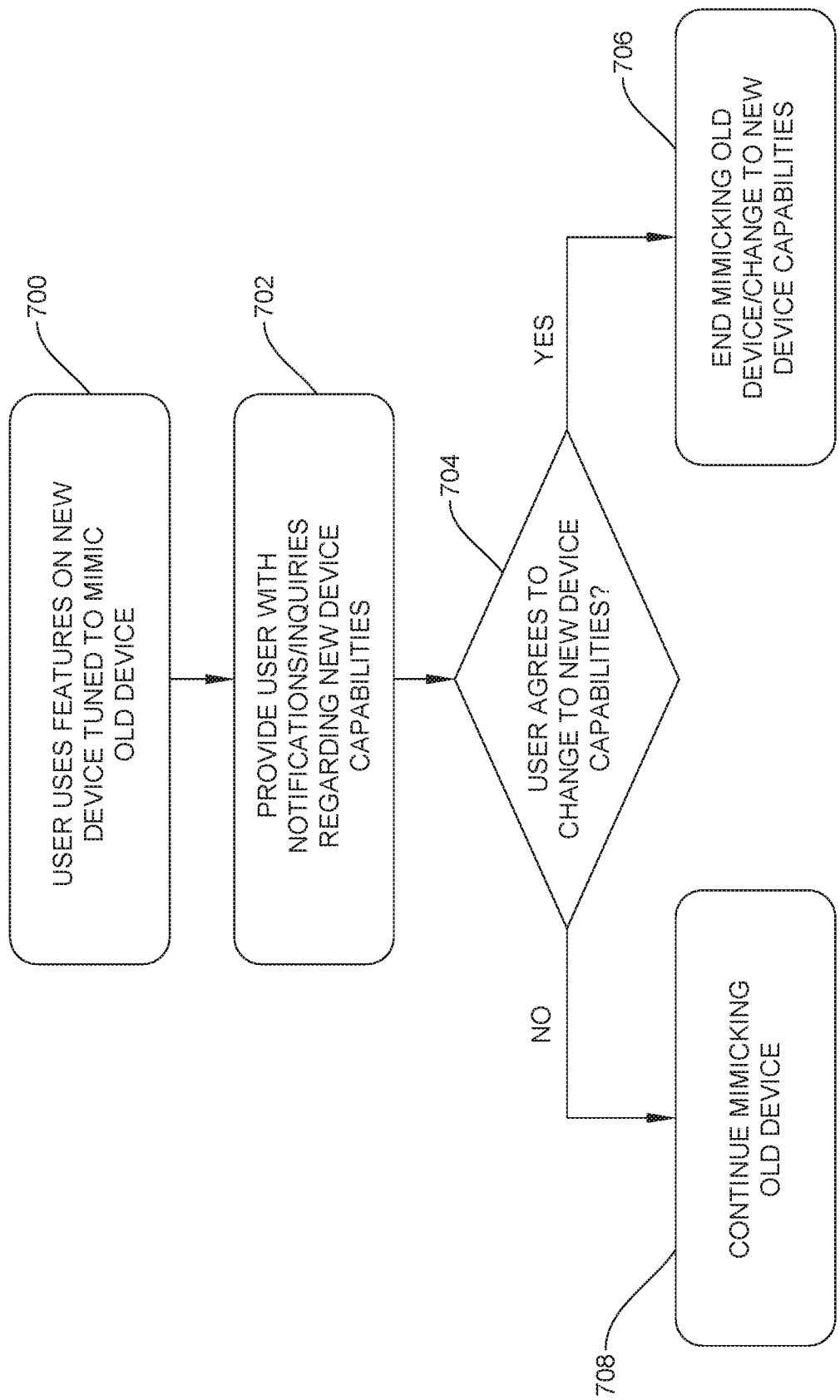

FIGS. 5-7 are block diagrams/flowcharts depicting various aspects of functionality described herein. Referring specifically to FIG. 5, at block 500, a list of the features supported by a first (or the old) mobile device is collected (and/or the features supported by the first mobile device are detected). At block 502, user-device interaction characteristics (or interaction characteristics), as described above, associated with a user's utilization of the first mobile device (e.g., with respect to the detected features of the first mobile device) are identified. As described above, the identification of the interaction characteristics may be based on various types of information received/detected during the user's utilization of the first mobile device, as indicated in block 504, such as distance between the device and the user, orientation of the device, humidity, action(s) taken by the user, etc. At block 506, the interaction characteristics are stored. As described above, the interaction characteristics may be stored, for example, by an operating system of the first mobile device and/or stored in a data file.

Referring now to FIG. 6, at block 600, the interaction characteristics are then imported (or transferred) to a second (or new) mobile device (e.g., via wireless communication, memory card, etc.). At block 602, the capabilities (and/or hardware attributes) of the second mobile device are determined (and/or compared to the hardware attributes of the first mobile device). At block 604, the operation and/or performance of the second mobile device is tuned based on the interaction characteristics and/or the capabilities of the second mobile device (e.g., the comparison of the hardware attributes of the first and second mobile devices), as described in greater detail above.

As shown in FIG. 7, at block 700, the user then utilizes the second mobile device and/or the specific features thereof after being tuned to mimic the first mobile device. In some embodiments, at block 702, either immediately or after a delay (e.g., a few hours, a day, a week, etc.), the user is provided with notifications and/or inquiries regarding the capabilities of the second mobile device, the effectiveness of the mimicking functionality, and/or the option of whether or not to continue the mimicking functionality. At block 704, if the user selects to change to the capabilities of the second mobile device, at block 706, the mimicking functionality is ended (or phased out). If the user does not select to change to the capabilities of the second mobile device, at block 708, the mimicking functionality is continued (e.g., until the user chooses otherwise).

Figure 8:
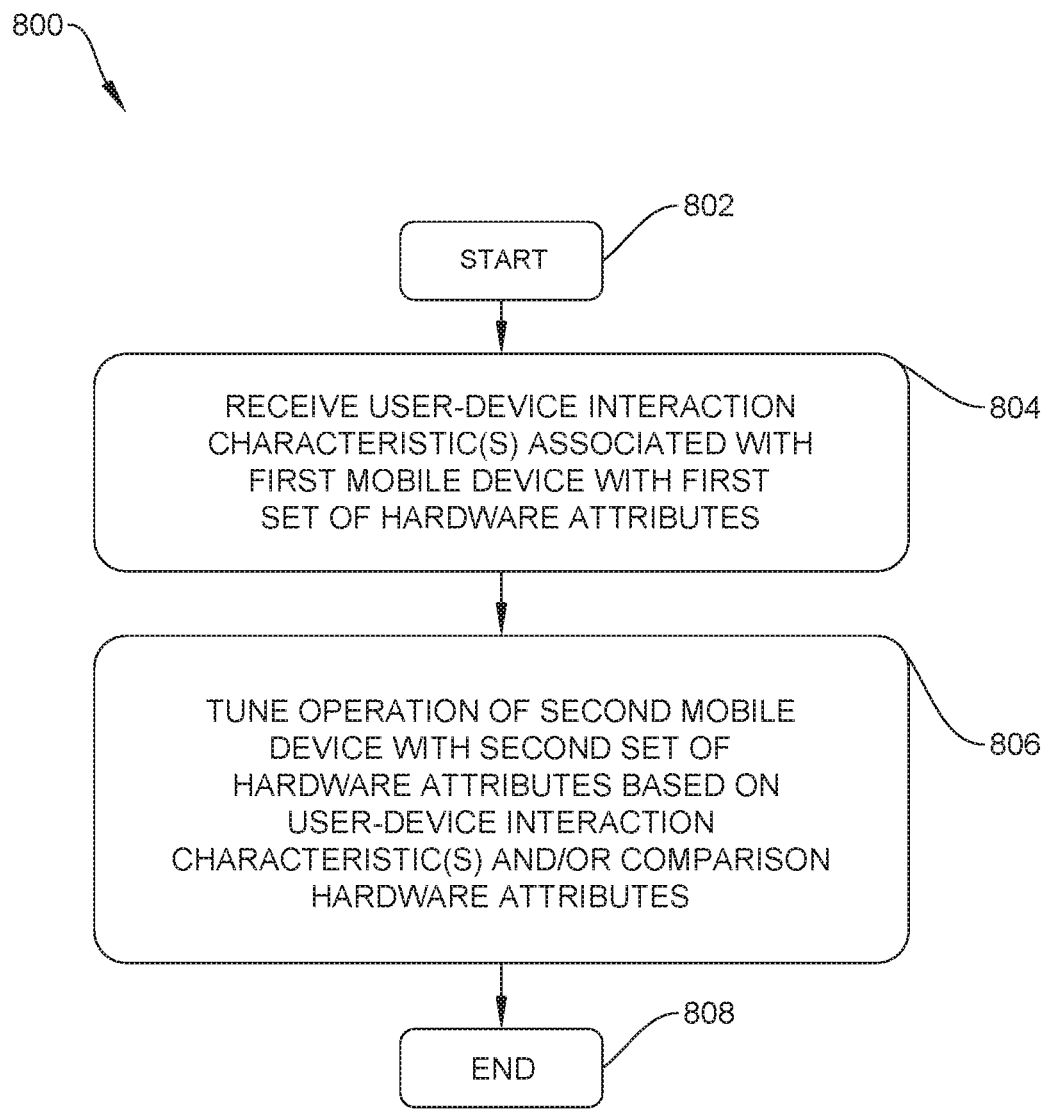
FIG. 8 is a flowchart diagram of an exemplary method for managing mobile electronic devices according to an embodiment of the present invention.

Turning to FIG. 8, a flowchart diagram of an exemplary method 800 for managing mobile electronic devices is provided. Method 800 begins (step 802) with a user utilizing a first (or old) mobile electronic device, having a first set of hardware attributes, and/or particular features thereon. As described above, the mobile electronic device may be a mobile phone, tablet, PDA, wearable technology device, etc.

At least one user-device interaction characteristic associated with the first mobile electronic device is received (and/or detected) (step 804). The at least one user-device interaction characteristic may include a first setting value associated with an aspect of functionality of the first mobile electronic device. The at least one user-device interaction characteristic may include at least one of an aspect of user behavior associated with the first mobile electronic device and a delay between the first mobile electronic device receiving user input and the first mobile electronic device performing an operation in response to receiving the user input. The receiving of the at least one user-device interaction characteristic may include transferring the at least one user-device interaction characteristic from the first mobile electronic device to a second mobile electronic device.

The operation of a second mobile electronic device having a second set of hardware attributes is tuned based on one or more of the at least one of the user-device interaction characteristics, a comparison of the first set of hardware attributes and the second set of hardware attributes, or a combination thereof (step 806). The second set of hardware attributes may be different than the first set of hardware attributes. The tuning of the operation of the second mobile electronic device may include automatically changing a value setting associated with the aspect of functionality of the second mobile electronic device to a second value setting, wherein the second value setting is different from the first value setting. The aspect of functionality may include, for example, speaker volume or display screen brightness.

Method 800 ends (step 808) with, for example, an indication of and/or inquiries regarding the tuning of the second mobile electronic device being provided to the user. Any feedback received from the user may be utilized to adjust the tuning of the second mobile electronic device (and/or other mobile electronic devices associated with other users). The user may also be provided with the option of whether or not to change the tuning of the second mobile electronic device (e.g., to take advantage of its capabilities, as described above).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing mobile electronic devices comprising:
   receiving at least one user-device interaction characteristic associated with behavior of ongoing usage of a first mobile electronic device having a first set of hardware attributes; and
   tuning an operation of a second mobile electronic device having a second set of hardware attributes based on the at least one of the user-device interaction characteristics and a comparison of the first set of hardware attributes and the second set of hardware attributes such that the operation of the second mobile electronic device is adjusted to mimic the behavior of ongoing usage of the first mobile electronic device, wherein tuning the operation of the second mobile electronic device includes modifying a control characteristic of the operation on the second electronic mobile device to compensate for performance differences identified during the comparison between the first set of hardware attributes and the second set of hardware attributes to enable the operation of the second electronic device to mimic the behavior of ongoing usage of the first mobile electronic device.

2. The method of claim 1, wherein the second set of hardware attributes is different than the first set of hardware attributes.

3. The method of claim 1, wherein the at least one user-device interaction characteristic includes a first setting value associated with an aspect of functionality of the first mobile electronic device.

4. The method of claim 3, wherein the tuning of the operation of the second mobile electronic device includes automatically changing a value setting associated with the aspect of functionality of the second mobile electronic device to a second value setting, wherein the second value setting is different from the first value setting.

5. The method of claim 4, wherein the aspect of functionality includes speaker volume or display screen brightness.

6. The method of claim 1, wherein the at least one user-device interaction characteristic includes at least one of an aspect of user behavior associated with the first mobile electronic device and a delay between the first mobile electronic device receiving user input and the first mobile electronic device performing an operation in response to receiving the user input.

7. The method of claim 1, wherein the receiving of the at least one user-device interaction characteristic includes transferring the at least one user-device interaction characteristic from the first mobile electronic device to the second mobile electronic device.

8. A system for managing mobile electronic devices comprising:
at least one processor that
receives at least one user-device interaction characteristic associated with behavior of ongoing usage of a first mobile electronic device having a first set of hardware attributes; and
tunes an operation of a second mobile electronic device having a second set of hardware attributes based on the at least one of the user-device interaction characteristics and a comparison of the first set of hardware attributes and the second set of hardware attributes such that the operation of the second mobile electronic device is adjusted to mimic the behavior of ongoing usage of the first mobile electronic device, wherein tuning the operation of the second mobile electronic device includes modifying a control characteristic of the operation on the second electronic mobile device to compensate for performance differences identified during the comparison between the first set of hardware attributes and the second set of hardware attributes to enable the operation of the second electronic device to mimic the behavior of ongoing usage of the first mobile electronic device.

9. The system of claim 8, wherein the second set of hardware attributes is different than the first set of hardware attributes.

10. The system of claim 8, wherein the at least one user-device interaction characteristic includes a first setting value associated with an aspect of functionality of the first mobile electronic device.

11. The system of claim 10, wherein the tuning of the operation of the second mobile electronic device includes automatically changing a value setting associated with the aspect of functionality of the second mobile electronic device to a second value setting, wherein the second value setting is different from the first value setting.

12. The system of claim 11, wherein the aspect of functionality includes speaker volume or display screen brightness.

13. The system of claim 8, wherein the at least one user-device interaction characteristic includes at least one of an aspect of user behavior associated with the first mobile electronic device and a delay between the first mobile electronic device receiving user input and the first mobile electronic device performing an operation in response to receiving the user input.

14. The system of claim 8, wherein the receiving of the at least one user-device interaction characteristic includes transferring the at least one user-device interaction characteristic from the first mobile electronic device to the second mobile electronic device.

15. A computer program product for managing mobile electronic devices by one or more processors, the computer program product comprising a non-transitory computer-readable storage medium having computer-readable program code portions stored therein, the computer-readable program code portions comprising:
an executable portion that receives at least one user-device interaction characteristic associated with behavior of ongoing usage of a first mobile electronic device having a first set of hardware attributes; and
an executable portion that tunes an operation of a second mobile electronic device having a second set of hardware attributes based on the at least one of the user-device interaction characteristics and a comparison of the first set of hardware attributes and the second set of hardware attributes such that the operation of the second mobile electronic device is adjusted to mimic the behavior of ongoing usage of the first mobile electronic device, wherein tuning the operation of the second mobile electronic device includes modifying a control characteristic of the operation on the second electronic mobile device to compensate for performance differences identified during the comparison between the first set of hardware attributes and the second set of hardware attributes to enable the operation of the second electronic device to mimic the behavior of ongoing usage of the first mobile electronic device.

16. The computer program product of claim 15, wherein the second set of hardware attributes is different than the first set of hardware attributes.

17. The computer program product of claim 15, wherein the at least one user-device interaction characteristic includes a first setting value associated with an aspect of functionality of the first mobile electronic device.

18. The computer program product of claim 17, wherein the tuning of the operation of the second mobile electronic device includes automatically changing a value setting associated with the aspect of functionality of the second mobile electronic device to a second value setting, wherein the second value setting is different from the first value setting.

19. The computer program product of claim 18, wherein the aspect of functionality includes speaker volume or display screen brightness.

20. The computer program product of claim 15, wherein the at least one user-device interaction characteristic includes at least one of an aspect of user behavior associated with the first mobile electronic device and a delay between the first mobile electronic device receiving user input and the first mobile electronic device performing an operation in response to receiving the user input.

21. The computer program product of claim 15, wherein the receiving of the at least one user-device interaction characteristic includes transferring the at least one user-device interaction characteristic from the first mobile electronic device to the second mobile electronic device.

* * * * *